United States Patent
McGinnis et al.

(10) Patent No.: US 9,656,903 B2
(45) Date of Patent: *May 23, 2017

(54) METHOD OF MANUFACTURING HIGH STRENGTH GLASS FIBERS IN A DIRECT MELT OPERATION AND PRODUCTS FORMED THERE FROM

(75) Inventors: Peter Bernard McGinnis, Gahanna, OH (US); Douglas Hofmann, Hebron, OH (US); David J. Baker, Newark, OH (US); John W. Wingert, Granville, OH (US); Byron Bemis, Newark, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 377 days.

This patent is subject to a terminal disclaimer.

(21) Appl. No.: 12/643,411

(22) Filed: Dec. 21, 2009

(65) Prior Publication Data

US 2010/0162772 A1 Jul. 1, 2010

(51) Int. Cl.
*C03B 32/00* (2006.01)
*C03B 37/02* (2006.01)
(Continued)

(52) U.S. Cl.
CPC ............ *C03B 37/02* (2013.01); *C03B 5/2353* (2013.01); *C03B 5/2356* (2013.01); *C03B 5/43* (2013.01);
(Continued)

(58) Field of Classification Search
CPC C03B 5/2353; C03B 5/43; C03B 5/02; C03B 5/06; C03B 5/065; C03B 5/2356
(Continued)

(56) References Cited

U.S. PATENT DOCUMENTS

| 3,044,888 A | 7/1962 | Provance et al. |
| 3,189,471 A * | 6/1965 | Thomas ............ C03C 3/085 |
| | | 264/DIG. 19 |

(Continued)

FOREIGN PATENT DOCUMENTS

| CA | 2528923 | 12/2004 |
| CN | 1113893 | 12/1995 |

(Continued)

OTHER PUBLICATIONS

Lund ("Tensile strength of glass fibres" dated Feb. 18, 2010).*
(Continued)

*Primary Examiner* — Jason L Lazorcik
(74) *Attorney, Agent, or Firm* — Calfee, Halter & Griswold LLP

(57) ABSTRACT

A method of forming high strength glass fibers in a glass melter substantially free of platinum or other noble metal materials, products made there from and batch compositions suited for use in the method are disclosed. One glass composition for use in the present invention includes 50-75 weight % $SiO_2$, 13-30 weight % $Al_2O_3$, 5-20 weight % MgO, 0-10 weight % CaO, 0 to 5 weight % $R_2O$ where $R_2O$ is the sum of $Li_2O$, $Na_2O$ and $K_2O$, has a higher fiberizing temperature, e.g. 2400-2900° F. (1316-1593° C.) and/or a liquidus temperature that is below the fiberizing temperature by as little as 45° F. (25° C.). Another glass composition for use in the method of the present invention is up to about 64-75 weight percent $SiO_2$, 16-24 weight percent $Al_2O_3$, 8-12 weight percent MgO and 0.25-3 weight percent $R_2O$, where $R_2O$ equals the sum of $Li_2O$, $Na_2O$ and $K_2O$, has a fiberizing temperature less than about 2650° F. (1454° C.), and a $\Delta T$ of at least 80° F. (45° C.). A forehearth for transporting molten glass from the glass melter to a forming position is disclosed. By using furnaces and/or forehearths substantially free of platinum or other noble metal materials, (Continued)

the cost of production of glass fibers is significantly reduced in comparison with the cost of fibers produced using a melting furnace lined with noble metal materials. High strength composite articles including the high strength glass fibers are also disclosed.

20 Claims, 5 Drawing Sheets

(51) Int. Cl.
*C03B 5/235* (2006.01)
*C03B 5/43* (2006.01)
*C03C 13/00* (2006.01)
*C03B 7/06* (2006.01)

(52) U.S. Cl.
CPC ................ *C03B 7/06* (2013.01); *C03B 7/065* (2013.01); *C03C 13/00* (2013.01); *Y02P 40/55* (2015.11); *Y02P 40/57* (2015.11)

(58) Field of Classification Search
USPC ...................................................... 501/68, 72
See application file for complete search history.

(56) References Cited

U.S. PATENT DOCUMENTS

| | | | |
|---|---|---|---|
| 3,220,915 A | 11/1965 | Shannon | |
| 3,360,386 A | 12/1967 | Kelley et al. | |
| 3,402,055 A * | 9/1968 | Harris | C03C 3/085 |
| | | | 244/159.1 |
| 3,408,213 A | 10/1968 | Provance et al. | |
| 3,484,259 A | 12/1969 | Lewis et al. | |
| 3,498,805 A | 3/1970 | Stalego | |
| 3,524,738 A | 8/1970 | Grubb et al. | |
| 3,535,096 A | 10/1970 | Bour et al. | |
| 3,709,705 A | 1/1973 | Hagedorn | |
| 3,804,646 A | 4/1974 | Dumbaugh, Jr. | |
| 3,833,388 A | 9/1974 | Ohlberg | |
| 3,861,926 A | 1/1975 | Irlam et al. | |
| 3,876,481 A | 4/1975 | Erickson et al. | |
| 3,887,386 A | 6/1975 | Majumdar | |
| 3,892,581 A * | 7/1975 | Burgman | C03C 13/00 |
| | | | 501/38 |
| 3,901,720 A | 8/1975 | Majumdar | |
| 3,902,881 A | 9/1975 | Pirooz | |
| 3,904,423 A | 9/1975 | Guthrie | |
| 3,945,838 A | 3/1976 | Erickson et al. | |
| 4,002,482 A | 1/1977 | Coenan | |
| 4,012,131 A | 3/1977 | Krohn | |
| 4,046,948 A | 9/1977 | Zlochower | |
| 4,063,001 A | 12/1977 | Zlochower | |
| 4,090,882 A | 5/1978 | Rauschenfels | |
| 4,199,364 A | 4/1980 | Neely | |
| 4,325,724 A | 4/1982 | Froberg | |
| 4,366,251 A | 12/1982 | Rapp | |
| 4,375,527 A | 3/1983 | Zahner | |
| 4,386,164 A | 5/1983 | Moser | |
| 4,491,951 A | 1/1985 | Dunn | |
| 4,569,471 A | 2/1986 | Ingemansson | |
| 4,582,748 A | 4/1986 | Eastes | |
| 4,764,487 A | 8/1988 | Lewis | |
| 4,824,806 A | 4/1989 | Yokoi et al. | |
| 4,857,485 A | 8/1989 | Brennan et al. | |
| 4,882,302 A | 11/1989 | Horiuchi et al. | |
| 4,892,846 A | 1/1990 | Rogers et al. | |
| 4,935,291 A | 6/1990 | Gunnink | |
| 4,976,587 A | 12/1990 | Johnston et al. | |
| 5,212,121 A | 5/1993 | Omata | |
| 5,248,637 A | 9/1993 | Taneda et al. | |
| 5,302,444 A | 4/1994 | Jackson et al. | |
| 5,332,699 A | 7/1994 | Olds et al. | |
| 5,474,425 A | 12/1995 | Lawlor | |
| 5,569,629 A | 10/1996 | TenEyck et al. | |
| 5,576,252 A | 11/1996 | Rapp et al. | |
| 5,585,312 A | 12/1996 | TenEyck et al. | |
| 5,691,255 A | 11/1997 | Jensen et al. | |
| 5,719,092 A | 2/1998 | Arrington | |
| 5,789,329 A | 8/1998 | Eastes et al. | |
| 5,819,614 A | 10/1998 | Jander | |
| 5,843,853 A | 12/1998 | Heitmann | |
| 5,851,932 A | 12/1998 | Dickson et al. | |
| 5,935,886 A | 8/1999 | Jensen et al. | |
| 5,948,535 A | 9/1999 | Chiurlo et al. | |
| 5,962,354 A | 10/1999 | Fyles et al. | |
| 5,997,977 A | 12/1999 | Zou et al. | |
| 6,063,470 A | 5/2000 | Zou et al. | |
| 6,069,100 A | 5/2000 | Naumann et al. | |
| 6,089,021 A | 7/2000 | Senandayake | |
| 6,101,847 A | 8/2000 | Shamp | |
| 6,136,735 A | 10/2000 | Gallo et al. | |
| 6,156,683 A | 12/2000 | Grove-Rasmussen et al. | |
| 6,169,047 B1 | 1/2001 | Nishizwa et al. | |
| 6,214,429 B1 | 4/2001 | Zou et al. | |
| 6,237,369 B1 * | 5/2001 | LeBlanc | C03B 5/04 |
| | | | 65/134.1 |
| 6,248,678 B1 | 6/2001 | Pinckney | |
| 6,300,264 B1 | 10/2001 | Ohara | |
| 6,306,786 B1 | 10/2001 | Koyama et al. | |
| 6,314,760 B1 | 11/2001 | Chenoweth | |
| 6,329,310 B1 | 12/2001 | Peuchert et al. | |
| 6,358,873 B1 | 3/2002 | Stewart | |
| 6,376,403 B1 | 4/2002 | Koyama et al. | |
| 6,399,527 B1 | 6/2002 | Kishimoto et al. | |
| 6,403,676 B1 | 6/2002 | Jia et al. | |
| 6,422,041 B1 | 7/2002 | Simpson et al. | |
| 6,451,720 B1 | 9/2002 | Kishimoto | |
| 6,457,943 B1 | 10/2002 | Olsen et al. | |
| 6,458,436 B1 | 10/2002 | Hansen et al. | |
| 6,468,428 B1 | 10/2002 | Nishii et al. | |
| 6,496,706 B1 | 12/2002 | Jon et al. | |
| 6,540,508 B1 | 4/2003 | Simpson et al. | |
| 6,579,599 B1 | 6/2003 | Blum et al. | |
| 6,686,304 B1 | 2/2004 | Wallenberger | |
| 6,794,322 B2 | 9/2004 | Sircar | |
| 6,809,050 B1 * | 10/2004 | McGinnis | C03C 13/00 |
| | | | 501/35 |
| 6,818,575 B2 | 11/2004 | Wallenberger | |
| 6,867,158 B2 | 3/2005 | Peuchert | |
| 6,933,045 B2 | 8/2005 | Tamura | |
| 6,933,252 B2 | 8/2005 | Pierce | |
| 6,998,361 B2 | 2/2006 | Lewis | |
| 7,022,634 B2 | 4/2006 | Hamilton et al. | |
| 7,189,671 B1 | 3/2007 | Lewis | |
| 7,259,118 B2 | 8/2007 | Jubb et al. | |
| 7,285,510 B2 | 10/2007 | Sakaguchi et al. | |
| 7,449,419 B2 | 11/2008 | Li | |
| 7,509,819 B2 * | 3/2009 | Baker | C03B 7/065 |
| | | | 432/247 |
| 7,781,355 B2 | 8/2010 | Berthereau et al. | |
| 7,799,713 B2 * | 9/2010 | Hofmann | C03C 13/00 |
| | | | 416/230 |
| 7,811,954 B2 | 10/2010 | Berthereau et al. | |
| 7,823,417 B2 * | 11/2010 | Hoffmann et al. | 65/335 |
| 9,029,279 B2 * | 5/2015 | Hofmann | C03C 3/085 |
| | | | 501/35 |
| 9,187,361 B2 * | 11/2015 | McGinnis | C03B 5/235 |
| 2001/0000500 A1 | 4/2001 | Meng | |
| 2001/0011058 A1 | 8/2001 | Tamura | |
| 2002/0000101 A1 | 1/2002 | Chenoweth | |
| 2002/0045528 A1 | 4/2002 | Kusuno et al. | |
| 2003/0018855 A1 | 1/2003 | McWilliams et al. | |
| 2003/0077178 A1 | 4/2003 | Sterns | |
| 2003/0100431 A1 | 5/2003 | Koyo et al. | |
| 2003/0166446 A1 | 9/2003 | Lewis | |
| 2003/0188554 A1 * | 10/2003 | Baker | C03B 7/065 |
| | | | 65/346 |
| 2003/0207748 A1 | 11/2003 | Wallenberger | |
| 2003/0224922 A1 * | 12/2003 | Wallenberger | C03C 13/06 |
| | | | 501/35 |
| 2004/0092379 A1 * | 5/2004 | Lewis | C03C 3/087 |
| | | | 501/70 |

(56) References Cited

U.S. PATENT DOCUMENTS

| | | |
|---|---|---|
| 2004/0220038 A1 | 11/2004 | Wolff |
| 2005/0009683 A1 | 1/2005 | Hamilton et al. |
| 2005/0014624 A1 | 1/2005 | Jubb et al. |
| 2005/0031703 A1 | 2/2005 | Beier et al. |
| 2005/0084440 A1 | 4/2005 | Chacon et al. |
| 2005/0085369 A1 | 4/2005 | Jensen |
| 2005/0090377 A1 | 4/2005 | Shelestak et al. |
| 2005/0107238 A1 | 5/2005 | Li |
| 2005/0130825 A1 | 6/2005 | Kravchenko et al. |
| 2005/0232828 A1 | 10/2005 | Merry |
| 2005/0234216 A1 | 10/2005 | Klein et al. |
| 2006/0001005 A1 | 1/2006 | Kishimoto et al. |
| 2006/0003884 A1 | 1/2006 | Nishizawa et al. |
| 2006/0257240 A1 | 11/2006 | Naskali et al. |
| 2007/0087139 A1 | 4/2007 | Creaux et al. |
| 2007/0105701 A1* | 5/2007 | Hoffmann ............... C03C 13/00 501/36 |
| 2007/0107220 A1 | 5/2007 | Bakhius et al. |
| 2008/0009403 A1* | 1/2008 | Hofmann et al. ............... 501/55 |
| 2008/0053152 A1 | 3/2008 | Kurachi et al. |
| 2008/0141721 A1* | 6/2008 | Adams ............... C03B 5/182 65/346 |
| 2009/0286440 A1 | 11/2009 | Lecomte et al. |
| 2010/0069220 A1 | 3/2010 | McGinnis |
| 2010/0093511 A1 | 4/2010 | Berthereau et al. |
| 2010/0160139 A1 | 6/2010 | McGinnis |
| 2010/0160140 A1 | 6/2010 | McGinnis |
| 2010/0184345 A1 | 7/2010 | Lalande et al. |
| 2011/0000263 A1 | 1/2011 | Hofmann |
| 2011/0003678 A1* | 1/2011 | Hofmann ............... C03C 13/00 501/32 |
| 2011/0039681 A1 | 2/2011 | Lecomte et al. |

FOREIGN PATENT DOCUMENTS

| | | |
|---|---|---|
| CN | 1243501 | 2/2000 |
| CN | 1392870 | 1/2003 |
| CN | 1678654 | 10/2005 |
| CN | 101580344 | 11/2009 |
| CN | 101597140 | 12/2009 |
| CN | 101691278 | 4/2010 |
| CN | 101838110 | 9/2010 |
| CN | 101549958 | 1/2011 |
| DE | 1496520 | 8/1969 |
| EP | 500325 | 8/1992 |
| EP | 931774 | 7/1999 |
| FR | 1357393 | 4/1964 |
| FR | 1435073 | 4/1966 |
| FR | 1534135 | 12/1968 |
| FR | 1589410 | 3/1970 |
| FR | 2223328 | 10/1974 |
| FR | 2692248 | 12/1993 |
| FR | 2856055 | 12/2004 |
| FR | 2879591 | 6/2006 |
| FR | 2916438 | 11/2008 |
| GB | 428720 | 5/1935 |
| GB | 1006524 | 10/1965 |
| GB | 1147718 | 4/1969 |
| GB | 1209244 | 10/1970 |
| GB | 1531287 | 11/1978 |
| JP | 45-011228 | 5/1970 |
| JP | 48-024411 | 7/1973 |
| JP | 51-055308 | 5/1976 |
| JP | 58-064243 | 4/1983 |
| JP | 58-088138 | 5/1983 |
| JP | 1-189985 | 7/1989 |
| JP | 1-239039 | 9/1989 |
| JP | 3-112650 | 5/1991 |
| JP | 4-050144 | 2/1992 |
| JP | 6-211543 | 8/1994 |
| JP | 6-219780 | 8/1994 |
| JP | 6-305773 | 11/1994 |
| JP | 7-010598 | 1/1995 |
| JP | 8-231240 | 9/1996 |
| JP | 2582361 | 2/1997 |
| JP | 09-078461 | 3/1997 |
| JP | 11-021147 | 1/1999 |
| JP | 1997-176694 | 1/1999 |
| JP | 2000-247677 | 9/2000 |
| JP | 2000-247683 | 9/2000 |
| JP | 2001-206733 | 7/2001 |
| JP | 2001-316961 | 11/2001 |
| JP | 2002-003237 | 1/2002 |
| JP | 2002-060252 | 2/2002 |
| JP | 2002-069941 | 3/2002 |
| JP | 2002-081022 | 3/2002 |
| JP | 2002-154843 | 5/2002 |
| JP | 2002154843 A * | 5/2002 |
| JP | 2002-293574 | 10/2002 |
| JP | 2003-137590 | 5/2003 |
| JP | 2003-160350 | 6/2003 |
| JP | 2003-171143 | 6/2003 |
| JP | 2003-183031 | 7/2003 |
| JP | 2003-238947 | 8/2003 |
| JP | 2003-239847 | 8/2003 |
| JP | 2003-321247 | 11/2003 |
| JP | 2004-091307 | 3/2004 |
| WO | 99/31021 | 6/1999 |
| WO | 00/15526 | 3/2000 |
| WO | 02/20419 | 3/2002 |
| WO | 02/42233 | 5/2002 |
| WO | 02/085315 | 10/2002 |
| WO | 2004/020506 | 3/2004 |
| WO | 2004/094794 | 11/2004 |
| WO | 2005/092808 | 10/2005 |
| WO | 2005/093227 | 10/2005 |
| WO | 2006/064164 | 6/2006 |
| WO | 2007/055964 | 5/2007 |
| WO | 2007/055968 | 5/2007 |
| WO | 2008/073585 | 6/2008 |
| WO | 2010/075258 | 7/2010 |
| WO | 2010/075262 | 7/2010 |
| WO | 2010/075267 | 7/2010 |

OTHER PUBLICATIONS

English Language Machine Translation of Sugano (JP 2002-154843)—Accessed at PAJ Aug. 7, 2015.*
Office action from U.S. Appl. No. 09/703,234 dated Apr. 15, 2002.
Office action from U.S. Appl. No. 09/703,234 dated Sep. 6, 2002.
Advisory action from U.S. Appl. No. 09/703,234 dated Nov. 19, 2002.
Office action from U.S. Appl. No. 09/703,234 dated Feb. 4, 2003.
Office action from U.S. Appl. No. 09/703,234 dated Jul. 11, 2003.
Advisory action from U.S. Appl. No. 09/703,234 dated Oct. 24, 2003.
Office action from U.S. Appl. No. 09/703,234 dated Dec. 16, 2003.
Notice of Allowance from U.S. Appl. No. 09/703,234 dated Jul. 6, 2004.
Office action from U.S. Appl. No. 10/560,068 dated Aug. 1, 2008.
Office action from U.S. Appl. No. 10/560,068 dated Dec. 15, 2008.
Advisory Action from U.S. Appl. No. 10/560,068 dated Feb. 25, 2009.
Office action from U.S. Appl. No. 10/560,068 dated May 7, 2009.
Office action from U.S. Appl. No. 10/560,068 dated Nov. 5, 2009.
Advisory Action from U.S. Appl. No. 10/560,068 dated Mar. 16, 2010.
Panel Decision of Pre-Appeal Brief from U.S. Appl. No. 10/560,068 dated Apr. 29, 2010.
Examiner's Answer from U.S. Appl. No. 10/560,068 dated Aug. 3, 2010.
Office action from U.S. Appl. No. 11/267,702 dated Dec. 23, 2008.
Notice of Allowance from U.S. Appl. No. 11/267,702 dated Jul. 29, 2009.
Office action from U.S. Appl. No. 11/267,702 dated Dec. 3, 2009.
Notice of Allowance from U.S. Appl. No. 11/267,702 dated Jun. 16, 2010.
Office action from U.S. Appl. No. 11/267,739 dated Dec. 18, 2008.

(56) References Cited

OTHER PUBLICATIONS

Notice of Allowance from U.S. Appl. No. 11/267,739 dated Jul. 13, 2009.
Office action from U.S. Appl. No. 11/267,739 dated Dec. 3, 2009.
Notice of Allowance from U.S. Appl. No. 11/267,739 dated Apr. 7, 2010.
Office action from U.S. Appl. No. 11/722,039 dated Oct. 28, 2009.
Office action from U.S. Appl. No. 11/722,039 dated Jun. 22, 2010.
Interview Summary from U.S. Appl. No. 11/722,039 dated Sep. 21, 2010.
Office action from U.S. Appl. No. 11/722,039 dated Oct. 19, 2010.
Office action from U.S. Appl. No. 11/722,039 dated Jun. 7, 2011.
Office action from U.S. Appl. No. 12/341,985 dated Nov. 17, 2010.
Office action from U.S. Appl. No. 12/341,985 dated Apr. 21, 2011.
Notice of Allowance from U.S. Appl. No. 12/341,985 dated Oct. 12, 2011.
Office action from U.S. Appl. No. 12/344,130 dated Nov. 17, 2010.
Office action from U.S. Appl. No. 12/344,130 dated Apr. 20, 2011.
Notice of Allowance from U.S. Appl. No. 12/344,130 dated Oct. 11, 2011.
Office action from U.S. Appl. No. 12/403,955 dated Dec. 9, 2011.
Office action from U.S. Appl. No. 12/847,206 dated Feb. 22, 2011.
Office action from U.S. Appl. No. 12/847,206 dated Oct. 14, 2011.
Office action from U.S. Appl. No. 12/880,289 dated Jul. 20, 2011.
Notice of Allowance from U.S. Appl. No. 12/880,289 dated Dec. 22, 2011.
International Search Report from PCT/FR04/01431 dated Jun. 11, 2003.
International Search Report from PCT/FR05/51090 date Mar. 23, 2006.
International Search Report and Written Opinion from PCT/US06/42406 dated May 8, 2007.
International Search Report and Written Opinion from PCT/US06/42437 dated Apr. 30, 2007.
International Search Report and Written Opinion from PCT/US09/68949 dated May 7, 2010.
International Search Report and Written Opinion from PCT/US09/68955 dated May 7, 2010.
International Search Report and Written Opinion from PCT/US09/68965 dated May 7, 2010.
Office action from Australian Application No. 2006312015 dated May 5, 2011.
Office action from Australian Application No. 2006312106 dated May 5, 2011.
Office action from Chinese Application No. 200580043075.7 dated Dec. 7, 2011.
Office action from Chinese Application No. 200680041104.0 dated Aug. 4, 2010.
Office action from Chinese Application No. 200680041104.0 dated Mar. 22, 2011.
Office action from Chinese Application No. 200680041104.0 dated Jul. 14, 2011.
Office action from European Application No. 01987549.1 dated Aug. 5, 2011.
Office action from European Application No. 05825565.4 dated Dec. 14, 2007.
Office action from European Application No. 05825565.4 dated Nov. 19, 2010.
Office action from European Application No. 05825565.4 dated May 9, 2011.
Office action from European Application No. 05825565.4 dated Mar. 31, 2011.
Communication from EP application No. 06827125.3 dated Jun. 4, 2009 which includes the EP OA from Feb. 13, 2009 and the Search Report dated Dec. 10, 2008.
Office action from Indian Application No. 2108/KOLNP/2007 dated Jun. 28, 2011.
Office action from Japanese Application No. 2007-546144 dated Sep. 13, 2011.
Office action from Korean Application No. 2003-7005873 dated Jun. 26, 2007.
Office action from Korean Application No. 2003-7005873 dated Nov. 29, 2007.
Office action from Mexican Application No. 07/006989 dated Oct. 24, 2011.
Communication regarding Mexican Application No. 08/05816 dated Mar. 15, 2011.
Office action from Mexican Application No. 08/005819 dated Mar. 16, 2011.
Office action from Mexican Application No. 08/005819 dated Jun. 3, 2011.
Office action from Russian Application No. 2008117091 dated Apr. 19, 2010.
Office action from Russian Application No. 2008117091 dated Dec. 13, 2010.
Office action from Russian Application No. 2008117092 dated Oct. 12, 2011.
Aslanova, "Steklyannye volokna", Glass Fibers, Moscow, Khimiya, 1979, I, 256 pp. pp. 33, 34, Fig. 3.2).
Chernyak et alo. "Nepreryvnoe steklyannoe volokno" Continuous Glass Fiber, Moscow, Khimiya, 1965.
Fredell, "Fiber metal laminates for improved structural integrity", 1992, conference paper.
Joosee, "Literature search of mechanical properties of fiber-reinforced plastics for wind turbine rotors", Dec. 1988 English abstract included.
Popov, et al. "Proizvodstvo i primenenie plavlenolitykh ogneuporov", Manufacture and Application of Molen Cast Refractory Materials, Moscow, Metallurgiya, 1985, IV, p. 212-213.
Office action from U.S. Appl. No. 11/722,039 dated Mar. 1, 2010.
Office action from Brazilian Application No. PI01149733 dated Mar. 10, 2009.
Office action from Canadian Application No. 2,528,923 dated Dec. 9, 2010 along with English translation of relevant portions of action.
Office action from Canadian Application No. 2,528,923 dated Jul. 12, 2011.
Office action from Chinese Application No. 200480015986.4 dated Jul. 6, 2007.
Office action from Chinese Application No. 200580043075.7 dated Feb. 5, 2010.
Office action from Chinese Application No. 200680041114.4 dated Feb. 29, 2012.
Office action from European Application No. 04767297.7 dated Sep. 8, 2006.
Search Report from French Registration No. 635569 (FR 0306981) dated Feb. 13, 2004.
Search Report from French Registration No. 658923 (FR 0413443) dated Aug. 16, 2005.
Office action from Indian Application No. 00501/KOLNP/2003 dated Jul. 7, 2006.
Office action from Indian Application No. 00501/KOLNP/2003 dated May 14, 2007.
Office action from Indian Application No. 2546/KOLNP/2005 dated Jun. 15, 2007.
Office action from Japanese Application No. 2002-544374 dated Sep. 28, 2007.
Office action from Japanese Application No. 2002-544374 dated Jul. 27, 2009.
Office action from Japanese Application No. 2002-544374 dated Jul. 12, 2010.
Office action from Japanese Application No. 2006-516274 dated Jun. 22, 2010.
Office action from Japanese Application No. 2006-516274 dated Feb. 22, 2011.
Office action from Korean Application No. 10-2005-7023679 dated Mar. 3, 2011.
Office action from Mexican Application No. PA/a/2002/000814 dated Feb. 22, 2006.
Office action from Mexican Application No. PA/a/2002/00814 dated Sep. 9, 2005.
Office action from Mexican Application No. PA/a/2002/00814 dated Jun. 23, 2005.

(56) References Cited

OTHER PUBLICATIONS

Office action from Mexican Application No. PA/a/2002/00814 dated Sep. 26, 2002.
Office action from Mexican Application No. 05/013323 dated Feb. 27, 2006.
Office action from Mexican Application No. 05/013323 dated May 29, 2009.
Office action from Mexican Application No. 07/06989 dated Aug. 22, 2007.
Office action from Russian Application No. 2007126843 dated Sep. 24, 2009.
Office action from Russian Application No. 2007126843 dated Dec. 11, 2009.
Office action from Canadian Application No. 2,426,637 dated Aug. 28, 2008.
Office action from Russian Application No. 2006100296/03 dated Jun. 8, 2008.
Office action from Russian Application No. 2006100296/03 dated Nov. 26, 2008.
Office action from U.S. Appl. No. 12/403,955 dated Apr. 24, 2012.
Office action from Taiwanese Application No. 094144552 dated May 7, 2012.
Notice of Allowance from U.S. Appl. No. 12/344,130 dated Jun. 7, 2012.
Notice of Allowance from U.S. Appl. No. 12/341,985 dated Jun. 11, 2012.
Office action from Russian Application No. 2008117092/03 dated Apr. 26, 2012.
Office action from Chinese Application No. 200680041104.0 dated Jun. 13, 2012.
English Translation of JP Patent No. 2002-154843. Foreign patent along with English abstract previously submitted.
Office action from U.S. Appl. No. 11/699,719 dated Jul. 2, 2012.
Office action from Canadian Application No. 2,592,026 dated May 15, 2012 along with English translation of relevant portions of action.
Office action from Mexican Application No. 07/06989 dated Jun. 26, 2012.
Notice of Allowance from U.S. Appl. No. 12/880,289 dated Aug. 31, 2012.
Office action from Chinese Application No. 200680041104.0 dated Sep. 13, 2012.
Office action from Japanese Application No. 2009-533917 dated Sep. 24, 2012.
Notice of Allowance from U.S. Appl. No. 12/341,985 dated Oct. 11, 2012.
Appeal Decision from U.S. Appl. No. 10/560,068 dated Aug. 15, 2012.
Office action from Canadian Application No. 2,626,733 dated Oct. 9, 2012.
Office action from European Application No. 09796243.5 dated Oct. 2, 2012.
Office action from Chinese Application No. 200680041114.4 dated Oct. 24, 2012.
Office action from European Application No. 09796559.4 dated Dec. 19, 2012.
Office action from Indian Application No. 1733/KOLNP/2008 dated Dec. 6, 2012.
Office action and Search Report from Taiwanese Application No. 95139183 dated Nov. 5, 2012 along with English translation of relevant portions of action.
Office action and Search Report from Taiwanese Application No. 95139185 dated Oct. 24, 2012 along with English translation of relevant portions of action.
Office action from Japanese Application No. 2008-540053 dated Jul. 30, 2012.
Office action from Japanese Application No. 2008-540052 dated Jul. 30, 2012.
Office action from Korean Application No. 10-2007-7016026 dated Aug. 9, 2012.
Office action from U.S. Appl. No. 11/722,039 dated Aug. 24, 2012.
Office action from Korean Application No. 2008-7010726 dated Nov. 14, 2012.
Office action from Korean Application No. 2008-7010727 dated Nov. 14, 2012.
Notice of Allowance from U.S. Appl. No. 11/699,719 dated Jul. 11, 2013.
Office action from Canadian Application No. 2,626,732 dated Jun. 13, 2013.
Office action from Canadian Application No. 2,626,733 dated Jun. 27, 2013.
Office action from Chinese Application No. 200980156454.5 dated Dec. 12, 2014.
Office action from U.S. Appl. No. 11/699,719 dated Jan. 22, 2013.
Office action from Chinese Application No. 200680041104.0 dated Jan. 14, 2013.
Office action from Mexican Application No. 11/06712 dated Feb. 1, 2013 along with English translation of relevant portions of action.
Reexamination Decision from Chinese Application No. 200580043075.7 dated Feb. 8, 2014.
Office action from Canadian Application No. 2,626,733 dated Mar. 5, 2014.
Office action from Chinese Application No. 200980156454.5 dated Mar. 21, 2014.
Communication/Search Report from European Application No. 06827148.5 dated Apr. 23, 2014.
Office action from Chinese Application No. 200980156910.6 dated Apr. 30, 2014.
Examination Report from Turkish Application No. 2011/06710 dated Mar. 18, 2014.
Office action from Brazilian Application No. PI0411336-5 dated Apr. 5, 2013.
Office action from Canadian Application No. 2,591,026 dated Mar. 25, 2013.
Office action from Chinese Application No. 200980156454.5 dated Apr. 11, 2013.
Office action from Chinese Application No. 200980156910.6 dated Apr. 16, 2013.
Refusal Decision from Russian Application No. 2008117092/03 dated Mar. 15, 2013.
Notice of Allowance from U.S. Appl. No. 11/699,719 dated May 7, 2013.
Notice of Allowance from U.S. Appl. No. 12/989,225 dated Mar. 11, 2013.
Office action from U.S. Appl. No. 12/989,225 dated Nov. 19, 2013.
Office action from Saudi Arabian Application No. 109300629 dated Jun. 5, 2013 along with English translation of relevant portions of action.
Office action from Indian Application No. 1732/KOLNP/2008 dated Mar. 15, 2013 received on May 25, 2013.
Office action from Chinese Application No. 200580043075.7 dated May 2, 2013.
Office action from U.S. Appl. No. 13/927,271 dated Jul. 9, 2014.
Office action from Indian Application No. 1733/KOLNP/2008 dated Jun. 19, 2014.
Office action from Taiwanese Application No. 98143905 dated Jun. 9, 2014 along with English translation of relevant portions of action.
Office action from Taiwanese Application No. 98143904 dated Jun. 9, 2014 along with English translation of relevant portions of action.
Office action from U.S. Appl. No. 13/927,271 dated Nov. 14, 2014.
Office action from Chinese Application No. 200680041114.4 dated Nov. 18, 2014.
Examination Report from Turkish Application No. 2011/069169 dated Aug. 29, 2014 received on Nov. 26, 2014.
Office action from Chinese Application No. 200680041114.4 dated Mar. 25, 2013.
Office action from Korean Application No. 10-2007-7016026 dated Feb. 25, 2013.
Notice of Allowance from U.S. Appl. No. 12/847,206 dated Apr. 8, 2013.
Office action from U.S. Appl. No. 10/560,068 dated Apr. 15, 2014.
Notice of Allowance from U.S. Appl. No. 12/847,206 dated Jul. 5, 2013.

(56) References Cited

OTHER PUBLICATIONS

Examiner's Answer from U.S. Appl. No. 11/722,039 dated Jul. 26, 2013.
Office action from Chinese Application No. 200680041114.4 dated Jul. 1, 2013.
Office action from Mexican Application No. 07/006989 dated Jun. 19, 2013.
Interview Summary from U.S. Appl. No. 10/560,068 dated Jul. 22, 2014.
Office action from Japanese Application No. 2008-540053 dated Jul. 26, 2014.
Office action from Chinese Application No. 200680041104.0 dated Jul. 23, 2014.
Office action from Australian Application No. 2009330199 dated Aug. 13, 2014.
Office action from Australian Application No. 2009330204 dated Aug. 16, 2014.
Office action from Japanese Application No. 2008-540053 dated Jul. 28, 2014.
Advisory Action from U.S. Appl. No. 10/560,068 dated Jul. 22, 2014.
Office Communication from European Application No. 06827125.3 dated Aug. 18, 2014.
Office action from U.S. Appl. No. 10/560,068 dated Oct. 10, 2013.
Office action from Japanese Application No. 2011-542538 dated Oct. 28, 2013.
Office action from Chinese Application No. 200980156910.6 dated Oct. 21, 2013.
Office action from U.S. Appl. No. 12/403,955 dated Oct. 23, 2013.
Office action from Japanese Application No. 2008-540052 dated Oct. 21, 2013.
Office action from Japanese Application No. 2008-540053 dated Oct. 21, 2013.
Office action from Saudi Arabian Application No. 109310016 dated Aug. 25, 2013 received on Dec. 8, 2013.
Office action from Russian Application No. 2011126895 dated Nov. 18, 2013 along with English translation of relevant portions of action.
Office action from Russian Application No. 2011126891 dated Nov. 1, 2013.
Office action from Russian Application No. 2010133664/03 dated Apr. 14, 2014.
Office action from U.S. Appl. No. 12/403,955 dated Feb. 19, 2014.
Office action from Japanese Application No. 2011-542542 dated Jan. 15, 2014.
Interview Summary from U.S. Appl. No. 10/560,068 dated Jan. 29, 2014.
Office action from Canadian Application No. 2,591,026 dated Jan. 24, 2014.
Office action from Chinese Application No. 200980156454.5 dated Dec. 26, 2013.
Office action from Mexican Application No. 11/06711 dated Aug. 21, 2014 along with English translation of relevant portions of action.
Office action from U.S. Appl. No. 12/403,955 dated Oct. 1, 2014.
Office action from U.S. Appl. No. 12/403,955 dated Feb. 27, 2015.
Office action from Mexican Application No. 11/06711 dated Jan. 25, 2015 along with English translation of relevant portions of action.
Office action from Chinese Application No. 200680041104.0 dated Feb. 16, 2015.
Office action from Canadian Application No. 2,747,993 dated Jun. 3, 2015.
Decision on Appeal from U.S. Appl. No. 11/722,039 dated Dec. 30, 2015.
Office action from Korean Application No. 2011-7017002 dated Dec. 8, 2015.
Office action from Korean Application No. 2011-7016946 dated Dec. 4, 2015.
Office action from Chinese Application No. 201410192431.2 dated Oct. 10, 2015.
Office action from Russian Application No. 2011137644 dated Sep. 17, 2015 along with English translation of relevant portions of action.
Notice of Allowance from U.S. Appl. No. 13/927,271 dated Jul. 7, 2015.
Notice of Allowance from U.S. Appl. No. 12/403,955 dated Jul. 9, 2015.
Office action from U.S. Appl. No. 10/560,068 dated Jun. 15, 2015.
Office action from Chinese Application No. 200980156454.5 dated May 22, 2015.
Office action from Chinese application No. 200680041114.4 dated Jul. 28, 2015 along with English translation of relevant portions of action.
Office action from Mexican Application No. 11/06711 dated Apr. 17, 2015 received on Jun. 19, 2015 along with English translation of relevant portions of action.
Office action from Norwegian Application No. 20073589 dated Jun. 9, 2016.
Office action from Norwegian Application No. 20056224 dated Jul. 18, 2016.
Office action from European Application No. 09796559.4 dated Jun. 6, 2016.
Office action from European Application No. 06827148.5 dated Jun. 22, 2016.
Office action from Indian Application No. 1733/KONLP/2088 dated Mar. 30, 2016.
Office action from Chinese Application No. 200980156454.5 dated May 12, 2016.
Office action from Mexican Application No. MX/a/2011/009345 dated Apr. 1, 2016.
Office action from Mexican Application No. MX/a/2011/009345 dated Apr. 26, 2016.
Office action from Mexican Application No. MX/a/2011/009345 dated Apr. 20, 2016.
Office action from U.S. Appl. No. 11/722,039 dated Mar. 11, 2016.
Office action from U.S. Appl. No. 10/560,068 dated Feb. 2, 2016.
Office action from Russian Application No. 2011137644 dated Feb. 1, 2016.
Office action from Norwegian Application No. 20056224 dated Feb. 23, 2016.
Office action from U.S. Appl. No. 11/722,039 dated Oct. 21, 2016.
Interview Summary from U.S. Appl. No. 10/560,068 dated Oct. 26, 2016.
English translation of Office action from Brazilian Application No. PI0618123-6 dated Oct. 4, 2016.
Office action from European Application No. 09796244.3 dated Oct. 28, 2016.
Office action from European Application No. 09796559.4 dated Oct. 28, 2016.
Office action from Canadian Application No. 2,748,000 dated Sep. 19, 2016.
Office action from Canadian Application No. 2,747,993 dated Jun. 22, 2016.
Office action from U.S. Appl. No. 15/055,893 dated Jul. 1, 2016.
Office action from U.S. Appl. No. 15/055,898 dated Jul. 5, 2016.
Office action from U.S. Appl. No. 10/560,068 dated Aug. 17, 2016.
Office action from Chinese Application No. 201410192431.2 dated Aug. 9, 2016.
Office action from Chinese Application No. 200980156454.5 dated Aug. 11, 2016.
Notice of Allowance from U.S. Appl. No. 14/798,512 dated Aug. 26, 2016.
Office action from Chinese Application No. 201510254376.X dated Dec. 20, 2016.
Office action from Chinese Application No. 201410192431.2 dated Dec. 28, 2016.
Office action from U.S. Appl. No. 15/055,898 dated Jan. 17, 2017.
Office action from U.S. Appl. No. 15/055,893 dated Jan. 13, 2017.
Office action from Chinese Application No. 201510532618.7 dated Mar. 2, 2017.
Office action from Brazilian Application No. PI 0518946-2 dated Feb. 7, 2017.

(56) References Cited

OTHER PUBLICATIONS

Notice of Allowance from U.S. Appl. No. 14/798,512 dated Mar. 1, 2017.
Office action from Mexican Application No. 11/09345 dated Jan. 6, 2017 received on Feb. 13, 2017.

* cited by examiner

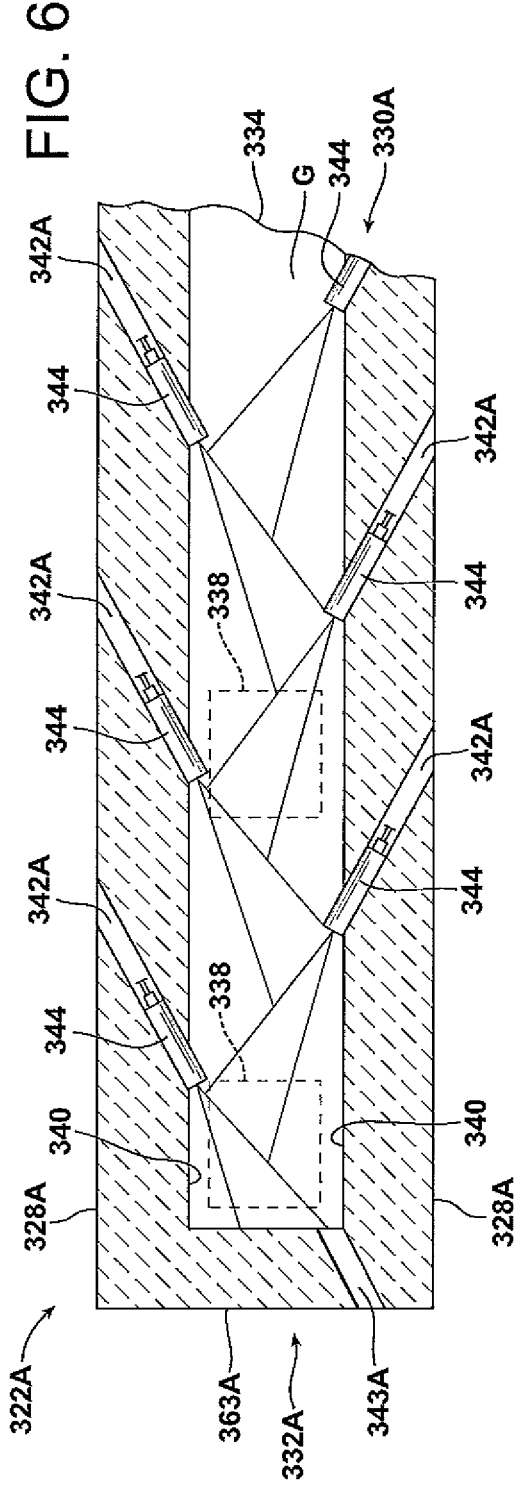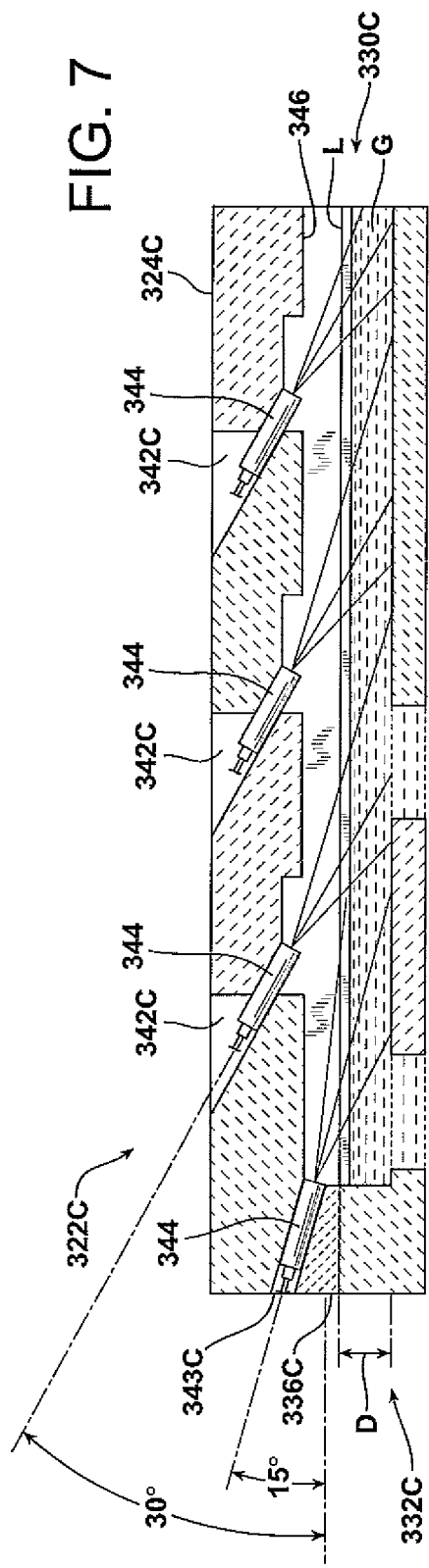

METHOD OF MANUFACTURING HIGH STRENGTH GLASS FIBERS IN A DIRECT MELT OPERATION AND PRODUCTS FORMED THERE FROM

TECHNICAL FIELD AND INDUSTRIAL APPLICABILITY OF THE INVENTION

The present invention is generally directed to a method of manufacturing continuous glass fibers for use in high-strength applications and products made there from, such as ballistic armor, pressure vessels, structural aerospace materials, structural marine materials, and structural materials for wind energy such as windmill masts and blades.

BACKGROUND OF THE INVENTION

Fiberglass reinforced composite materials have been available for use in marine and aerospace materials for some time. Other fiber materials such as carbon and aramid fibers are available for use, although at substantially higher cost. The articles of the present invention may use any known manufacturing method, including compression molding, laminating, spray up, hand laying, prefabricated lay-up (prepreg), compression molding, vacuum bag molding, pressure bag molding, press molding, transfer molding, vacuum assisted resin transfer molding, pultrusion molding, filament winding, casting, autoclave molding, centrifugal casting resin transfer and continuous casting. The properties of the composite are controlled by the fibers and the resin, and synergy between the two, that produces material properties unavailable from the individual materials.

A number of resins are useful in the manufacture of composite articles including polyester resin, vinylester resin and epoxy resin. Polyester resin is suitable for a number of situations. Vinylester resin has lower viscosity precure and more flexible postcure than polyester resin and is typically more resistant to degradation. Epoxy resin is typically transparent when cured. Epoxy resin is a polyether resin formed by the polymerization bisphenol A, bisphenol F, bisphenol C, and compounds of similar structure with epichlorohydrin resulting in the formation of the reactive oxirane linkage. Epoxy resins may react with a variety of curing agents, including amines, anhydrides, mercaptans, polyesters to form an infusable solid. The reaction is a condensation reaction typically does not create by-products. Cured epoxy resins have high strength, and low shrinkage during curing. They are used as coatings, adhesives, castings, composites, or foam. Epoxy resins are also desirable for use in high strength applications as a structural matrix material or as a structural glue. Phenolics are thermosetting resins formed by the condensation of phenol, or of a phenol derivative, with an aldehyde, typically a formaldehyde. Phenolics are used chiefly in the manufacture of paints and plastics. Other specific high strength modulus resins include bismaleimide, poly-amide, vinyl ester phenolic, ethylene-acrylate or methacrylate copolymers, high strength medium modulus thermoplastics such as an ionomer (i.e. crosslinked ethylene-methyl acrylate or methyl methacrylate copolymer), polycarbonate, polyurethane, nylon, aramid, modified epoxies.

The most common high strength glass composition for making continuous glass fiber strands is "S-Glass." S-Glass is a family of glasses composed primarily of the oxides of magnesium, aluminum, and silicon with a chemical composition that produces glass fibers having a higher mechanical strength than E-Glass fibers. A commonly used member of the S-Glass family is known as S2-Glass. S2-Glass includes approximately 65 weight % $SiO_2$, 25 weight % $Al_2O_3$, and 10 weight % MgO. S-glass has a composition that was originally designed to be used in high-strength applications such as ballistic armor.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains approximately 58-60 weight % $SiO_2$, 23.5-25.5 weight % $Al_2O_3$, 14-17 weight % CaO plus MgO, 0% $B_2O_3$, 0% $F_2$ and less than 2 weight % miscellaneous components. R-Glass contains more alumina and silica than E-Glass and requires higher melting and processing temperatures during fiber forming. Typically, the melting and processing temperatures for R-Glass are at least 160° C. higher than those for E-Glass. This increase in processing temperature typically requires the use of a high-cost platinum-lined melter. In addition, the close proximity of the liquidus temperature to the forming temperature in R-Glass requires that the glass be fiberized at a higher temperature than E-Glass.

Other known high-strength glass compositions can be found in U.S. patent application Ser. No. 11/267,739 entitled "Composition for High Performance Glass, High Performance Glass Fibers and Articles Therefrom", published as U.S. Patent Application Pub. No. 2008/0009403.

Both R-Glass and S-Glass are produced by melting the constituents of the compositions in a platinum-lined melting container. The costs of forming R-Glass and S-Glass fibers are dramatically higher than E-Glass fibers due to the cost of producing the fibers in such melters. Thus, there is a need in the art for methods of forming glass compositions useful in the formation of high performance glass fibers from a direct-melt process in a furnace substantially free of platinum or other noble metal materials and products formed there from.

SUMMARY OF THE INVENTION

The present invention includes a process for producing refined glass from a raw glass batch with a glass melter substantially free of platinum or other noble metal materials. The process includes charging a raw glass batch to a melting zone of a glass melter, melting the raw glass batch within the melting zone and forming continuous fibers from the melt. The present invention also includes fibers formed by such a method, and products made from such fibers.

In one embodiment the invention comprises a method of forming high strength glass fibers in a continuous system having a furnace, a forehearth, and a bushing. The method includes providing a glass melting furnace for receiving glass batch and discharging molten glass, and lining at least a portion of the furnace with a material substantially free of noble metal materials to form a furnace glass contact surface. Glass batch is supplied to the furnace, the glass batch being capable of forming a fiberizable molten glass having a fiberizing ΔT greater than 45° F. (25° C.) and for producing glass fibers having a composition comprising about 50-about 75 weight percent $SiO_2$; about 15-about 30 weight percent $Al_2O_3$; about 5-about 20 weight percent MgO; about 0-about 10 weight percent CaO; and about 0-about 5 weight percent $R_2O$, where $R_2O$ equals the sum of $Li_2O$, $Na_2O$ and $K_2O$. The glass batch is melted in the furnace by providing heat from a furnace heat source, such as oxy-fuel burners, forming a pool of molten glass in contact with the furnace glass contact surface. A forehearth is provided for transporting molten glass from the furnace to the bushing, and at least a portion of the forehearth is lined with a material substantially free of noble metal materials to form a forehearth glass contact surface. The molten glass is transported in the forehearth while heat is provided from a forehearth heat source and flows through the forehearth along a substantially horizontal flow path formed by the forehearth glass contact surface. The molten glass is discharged from the forehearth into the bushing at a temperature of about 2400° F. (1316° C.) to about 2900° F. (1593° C.) and a predetermined viscosity (e.g. about 1000 poise), and is formed into continuous fibers.

The invention includes a method of manufacturing a glass composition for the formation of continuous glass fibers and products made there from that are suitable for use in high-strength applications. Compositions useful in the present invention may be inexpensively formed into glass fibers using low-cost, direct melting in a furnace substantially free of platinum or other noble metal materials, including alloys thereof.

One composition useful in the present invention includes 64-75 weight % $SiO_2$, 16-26 weight % $Al_2O_3$, 8-12 weight % MgO and 0 to 3.0 weight % $R_2O$ where $R_2O$ is the sum of $Li_2O$, $Na_2O$ and $K_2O$.

Another composition useful in the present invention includes 64-75 weight % $SiO_2$, 16-24 weight % $Al_2O_3$, 8-12 weight % MgO and 0.25 to 3.0 weight % $R_2O$ where $R_2O$ is the sum of $Li_2O$, $Na_2O$ and $K_2O$. In certain embodiments, the glass composition is composed of 64-70 weight % $SiO_2$, 17-22 weight % $Al_2O_3$, 9-12 weight % MgO and 1.75-3.0 weight % $R_2O$ where $R_2O$ is the sum of $Li_2O$, $Na_2O$ and $K_2O$. In another embodiment, a glass composition useful in the present invention is composed of 64-70 weight % $SiO_2$, 17-22 weight % $Al_2O_3$, 9-12 weight % MgO and 1.75-3.0 weight % $Li_2O$.

Still another composition useful in the present invention includes 50-75 weight % $SiO_2$, 13-30 weight % $Al_2O_3$, 5-20 weight % MgO, 0-10 weight % CaO, 0 to 5 weight % $R_2O$ where $R_2O$ is the sum of $Li_2O$, $Na_2O$ and $K_2O$.

In certain exemplary embodiments, the composition does not contain more than about 5.0 weight % of compounds such as CaO, $P_2O_5$, ZnO, $ZrO_2$, SrO, BaO, $SO_3$, F, $B_2O_3$, $TiO_2$, $Fe_2O_3$, $CeO_2$ and $BeO_2$. In other exemplary embodiments the composition is devoid of intentionally added $CeO_2$ and $BeO_2$. In still other exemplary embodiments, the composition preferably does not contain more than about 4 weight % of compounds or halogens such as ZnO, $SO_3$, Fluorine, $B_2O_3$, $TiO_2$, $ZrO_2$ and $Fe_2O_3$.

In some exemplary embodiments, the desired properties of the high performance fibers manufactured by the present invention include a fiberizing temperature of less than 2650° F. (1454° C.) and a liquidus temperature that is preferably below the fiberizing temperature by at least 80° F. (44° C.), more preferably by at least about 120° F. (67° C.), and most preferably by at least about 150° F. (83° C.).

In other exemplary embodiments, the desired properties of the high performance fibers manufactured by the present invention include a fiberizing temperature of 2400-2900° F. (1316-1593° C.) and a liquidus temperature that is below the fiberizing temperature by at least 45° F. (25° C.).

The present invention also provides a structural part having improved structural properties with decreased costs and improved manufacturability. The direct melt formation of the continuous glass fibers uses low-cost melting in a glass melter substantially free of platinum or other noble metal materials. The relatively low fiberizing temperature of the glass fibers used in the high-strength applications of the present invention allows improved fiber processing at decreased cost. The articles of the present invention are typically formed by compression molding, laminating, spray up, hand laying, prefabricated lay-up (prepreg), compression molding, vacuum bag molding, pressure bag molding, press molding, transfer molding, vacuum assisted resin transfer molding, pultrusion molding, filament winding, casting, autoclave molding, centrifugal casting resin transfer or continuous casting.

The fibers produced and used in the present invention are substantially less expensive to make and also have good strength and density properties. The density of the fibers used in the present invention range between 2.434-2.520 g/cc, and more preferably 2.434-2.486 g/cc and have a measured modulus greater than 12.7 MPsi and a measured pristine fiber strength greater than 680 KPsi.

BRIEF DESCRIPTION OF THE DRAWINGS

FIG. 6 is a top plan view in cross-section of an exemplary forehearth useful in the method of the present invention for transporting molten glass from the glass melting furnace to the bushing assembly/support.

FIG. 7 is a side elevation view in cross-section of another exemplary forehearth useful in the method of the present invention.

DETAILED DESCRIPTION AND PREFERRED EMBODIMENTS OF THE INVENTION

Figure 1:
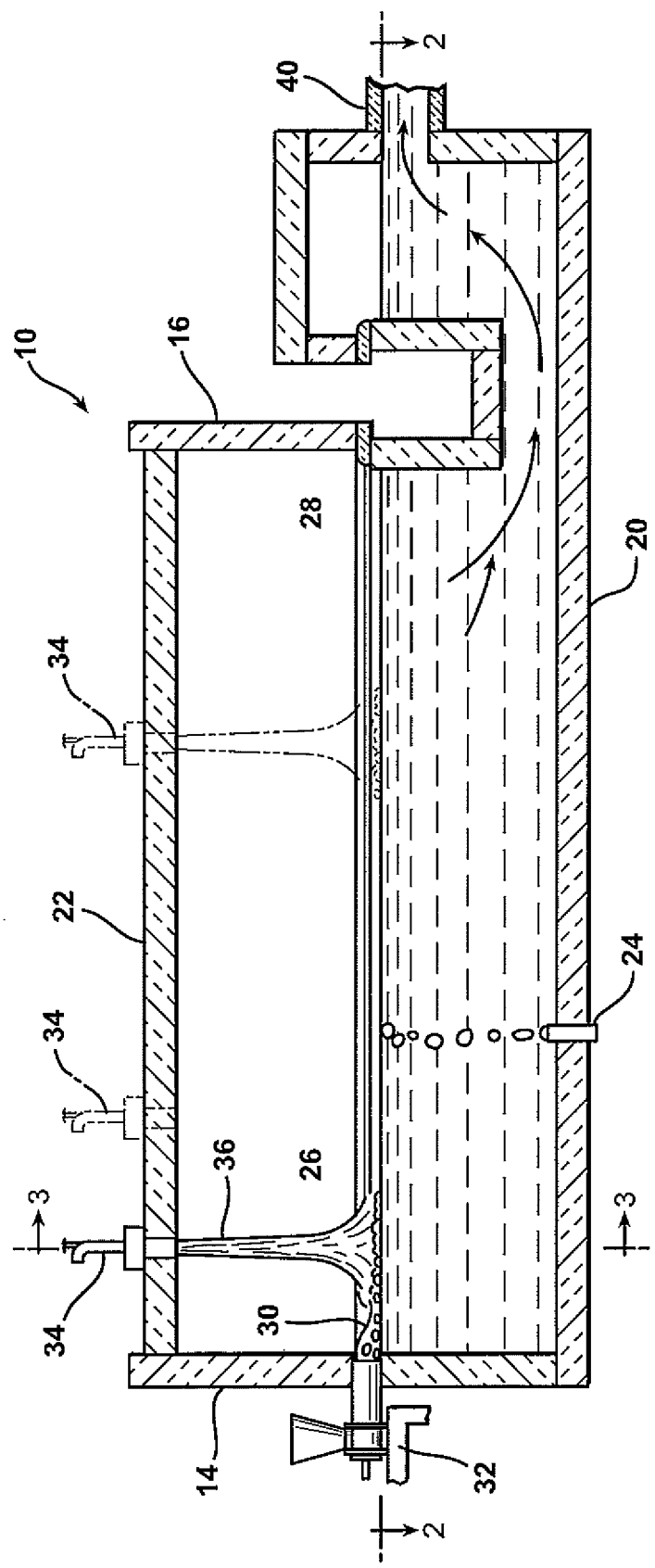
FIG. 1 is a cross-sectional longitudinal view of a glass melting furnace useful with the method of the present invention.
Figure 2:
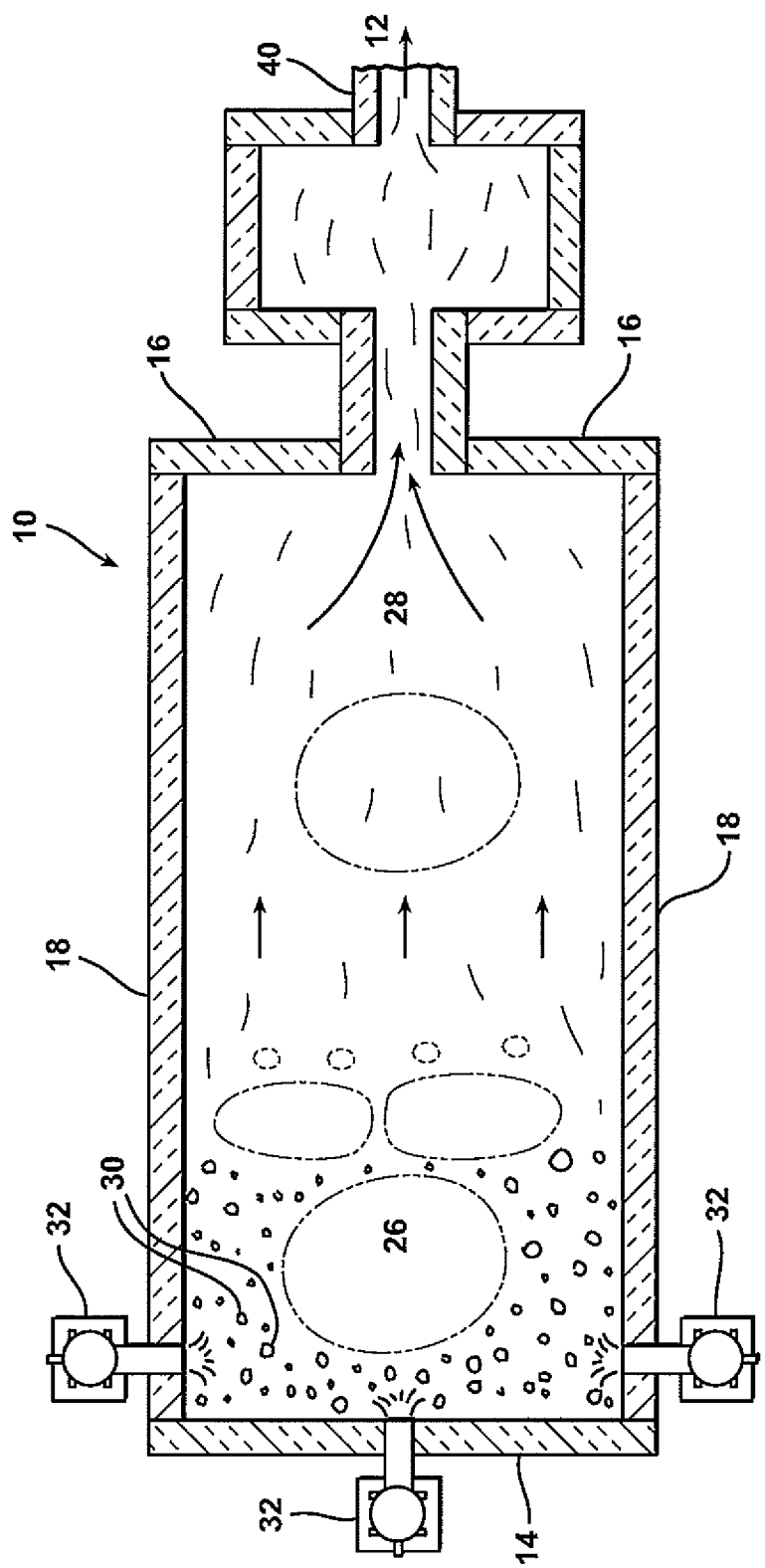
FIG. 2 is a cross-sectional plan view of the glass melting furnace of FIG. 1 taken along line 2-2.
Figure 3:
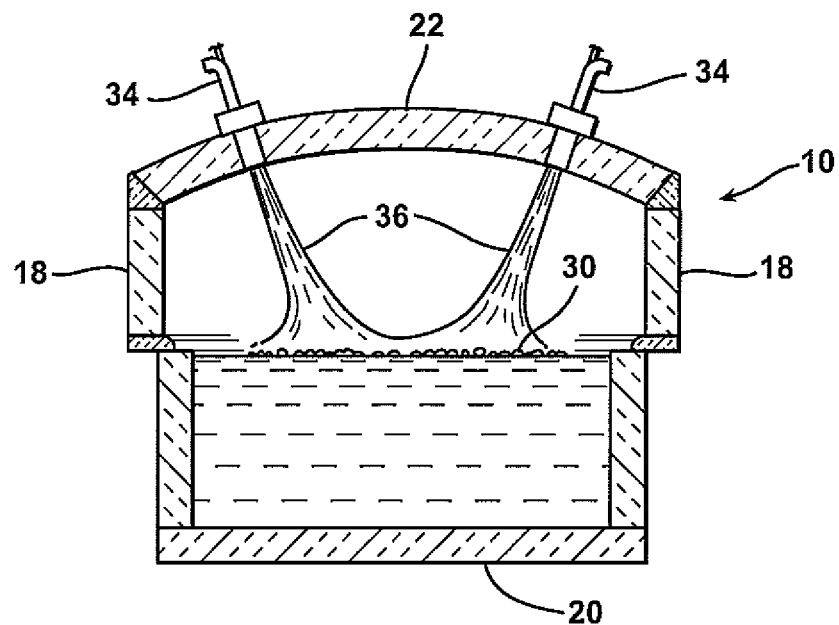
FIG. 3 is a cross-sectional view of the glass melting furnace of FIG. 1 taken along line 3-3 illustrating two burners adjacent the upstream end wall of the furnace.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Fiberizing properties of the glass composition used to form the glass fibers of the present invention include the fiberizing temperature, the liquidus, and delta-T. Unless otherwise defined herein, the fiberizing temperature is defined as the temperature that corresponds to a viscosity of 1000 poise (log 3 temperature). One skilled in the art will recognize that other fiberizing temperatures may be defined, e.g. a fiberizing temperature may be defined as the temperature that corresponds to a viscosity of 316 poise (log 2.5 temperature).

As discussed in more detail below, in certain embodiments a lowered fiberizing temperature reduces the production cost of the fibers, allows for a longer bushing life, increases throughput, permits the glass to be melted in a melter substantially free of platinum or other noble metal materials, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive method and composition to be melted in a refractory-lined melter, or a melter with externally cooled walls, since both its melting and fiberizing temperatures are below the upper use temperatures of many commercially available refractories or other materials when external cooling is supplied.

The liquidus is defined as the highest temperature at which equilibrium exists between liquid glass and its primary crystalline phase. At all temperatures above the liquidus, the glass is free from crystals in its primary phase. At temperatures below the liquidus, crystals may form.

Another fiberizing property is delta-T (ΔT), which is defined as the difference between the fiberizing temperature and the liquidus. A larger ΔT offers a greater degree of flexibility during the formation of the glass fibers and helps to inhibit devitrification of the glass (that is, the formation of crystals within the melt) during melting and fiberizing. Increasing the ΔT also reduces the production cost of the glass fibers by allowing for a greater bushing life and by providing a wider process window for forming fibers.

Conversely a higher fiberizing temperature and/or a smaller ΔT means the fiber formation process is less forgiving, being more sensitive to temperature variations, cold spots and slow moving glass.

The glass compositions employed in the present invention are advantageously suitable for melting in a furnace or glass melter substantially free of platinum or other noble metal materials and alloys thereof, including traditional, commercially available refractory-lined glass melters, and commercially available glass melters lined with externally cooled walls, e.g. water-cooled walls.

Starting batch components typically include $SiO_2$ (ground silica sand), and $Al_2O_3$ (calcined alumina), $Li_2CO_3$ (lithium carbonate), $H_3BO_3$ (boric acid), $NaCaB_5O_9 \cdot 8H_2O$ (ulexite), $2CaO-3B_2O_3-5H_2O$ (colemanite) as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite). One skilled in the art will appreciate that other starting materials may be used. Additional nonlimiting examples of suitable starting batch components include kaolinite $(Al_2Si_2O_5(OH)_4)$, pyrophyllite $(Al_2Si_4O_{10}(OH)_2)$, bauxite $(AlO(OH))$, wollastonite $(CaSiO_3)$, spodumene $(LiAlSi_2O_6)$, feldspar $(CaAl_2Si_2O_8)$, dolomite $(CaMg(CO_2)_2)$, lime (CaO), dolomitic quicklime $(CaMgO_2)$, and hydrated lime $(Ca(OH)_2)$.

Glass Melting Furnace

FIGS. 1-4 depict a glass melting furnace (10) useful in the method of forming the glass fibers described herein and set forth in the examples and claims below. It may also be desirable to use oxygen-fired heating within the melting furnace, as disclosed in U.S. Pat. No. 7,509,819 entitled "OXYGEN-FIRED FRONT END FOR GLASS FORMING OPERATION", inventors David J Baker et al., herein incorporated in its entirety by reference. The glass melting furnace (10) provides molten glass to a glass forehearth (12).

In one exemplary embodiment, the molten glass is composed of 50-75 weight % $SiO_2$, 13-30 weight % $Al_2O_3$, 5-20 weight % MgO, 0-10 weight % CaO, 0 to 5 weight % $R_2O$ where $R_2O$ is the sum of $Li_2O$, $Na_2O$ and $K_2O$. This exemplary embodiment includes glass compositions having a higher fiberizing temperature, e.g. 2400-2900° F. (1316-1593° C.) and/or a liquidus temperature that is below the fiberizing temperature by as little as 45° F. (25° C.).

In another exemplary embodiment, the molten glass is composed of about 64-75 weight % $SiO_2$, 16-26 weight % $Al_2O_3$, 8-12 weight % MgO and 0 to 3.0 weight % $R_2O$ where $R_2O$ is the sum of $Li_2O$, $Na_2O$ and $K_2O$.

In yet another exemplary embodiment, the molten glass is composed of about 64-75 weight % $SiO_2$, 16-24 weight % $Al_2O_3$, 8-12 weight % MgO and 0.25 to 3.0 weight % $R_2O$ where $R_2O$ is the sum of $Li_2O$, $Na_2O$ and $K_2O$. A fiber formed in accordance with the method of this exemplary embodiment will have a fiberizing temperature of less than 2650° F. (1454° C.), and in certain embodiments less than about 2625° F. (1458° C.), in other embodiments less than about 2600° F. (1427° C.) and in certain embodiments less than about 2575° F. (1413° C.) and a liquidus temperature that is below the fiberizing temperature in certain embodiments by at least 80° F. (44° C.), and in other embodiments by at least about 120° F. (67° C.), and in yet other embodiments by at least about 150° F. (83° C.).

In still another exemplary embodiment, the molten glass is composed of 50-75 weight % $SiO_2$, 13-30 weight % $Al_2O_3$, 5-20 weight % MgO, 0-10 weight % CaO, 0 to 5 weight % $R_2O$ where $R_2O$ is the sum of $Li_2O$, $Na_2O$ and $K_2O$. This exemplary embodiment includes glass compositions having a liquidus temperature that is above the log 3 fiberizing temperature, i.e. a negative ΔT such as −122° F. (−68° C.). Such a composition may be fiberized at higher temperature, e.g. a log 2.5 fiberizing temperature corresponding to a viscosity of 316 poise.

In certain exemplary embodiments, the composition does not contain more than about 5.0 weight % of oxides or compounds such as CaO, $P_2O_5$, ZnO, $ZrO_2$, SrO, BaO, $SO_3$, Fluorine, $B_2O_3$, $TiO_2$, $Fe_2O_3$, $K_2O$, $CeO_2$ and $BeO_2$. In other exemplary embodiments the composition is devoid of intentionally added $CeO_2$ and $BeO_2$.

The fibers produced and used in the present invention are substantially less expensive to make and also have good strength and density properties. The density of the fibers used in the present invention range between 2.434-2.520 g/cc, and more preferably 2.434-2.486 g/cc. Further, the glass fibers of the present invention, in certain embodiments, will have a pristine fiber strength in excess of 680 KPSI, and in certain other embodiments a strength in excess of about 700 KPSI, and in yet other embodiments a strength in excess of about 730 KPSI. Further, the glass fibers will advantageously have a modulus greater than 12.0 MPSI, and in certain embodiments greater than about 12.18 MPSI, and in some embodiments greater than about 12.7 MPSI.

The method of the present invention is preferably performed using the glass melting furnace (10), which includes an elongated channel having an upstream end wall (14), a downstream end wall (16), side walls (18), a floor (20), and a roof (22). Each of the components of the glass melting furnace (10) are made from appropriate refractory materials such as alumina, chromic oxide, silica, alumina-silica, zircon, zirconia-alumina-silica, or similar oxide-based refractory materials, in particular the surfaces that are in contact with the molten glass. The roof (22) is shown generally as having an arcuate shape transverse to the longitudinal axis of the composition the channel; however, the roof may have any suitable design. The roof (22) is typically positioned between about 3-10 feet above the surface of the glass batch (30). The glass batch (30) is a mixture of raw materials used in the manufacture of glass in accordance with the present invention.

The glass melting furnace (10) may optionally include one or more bubblers (24) and/or electrical boost electrodes (not shown). The bubblers (24) and/or electrical boost electrodes increase the temperature of the bulk glass and increase the molten glass circulation under the batch cover.

Bubblers (24) and/or electrical boost electrodes may be particularly useful in the second and third exemplary embodiments, which include glass compositions having a higher fiberizing temperature, e.g. 2400-2900° F. (1316-1593° C.) and/or a low ΔT, e.g. as low as 45° C. (25° F.), or even a negative ΔT such as −122° F. (−68° C.), where the potential for devitrification is greater.

In addition, the glass melting furnace (10) may include two successive zones, an upstream melting zone (26) and a downstream refining zone (28). In the melting zone (26), the glass batch composition (30) may be charged into the furnace using a charging device (32) of a type well-known in the art.

In one suitable melter configuration, the glass batch material (30) forms a batch layer of solid particles on the surface of the molten glass in the melting zone (26) of the glass melting furnace (10). The floating solid batch particles of the glass batch composition (30) are at least partially melted by at least one burner (34) having a controlled flame shape and length mounted within the roof (22) of the glass melting furnace (10).

Figure 4:
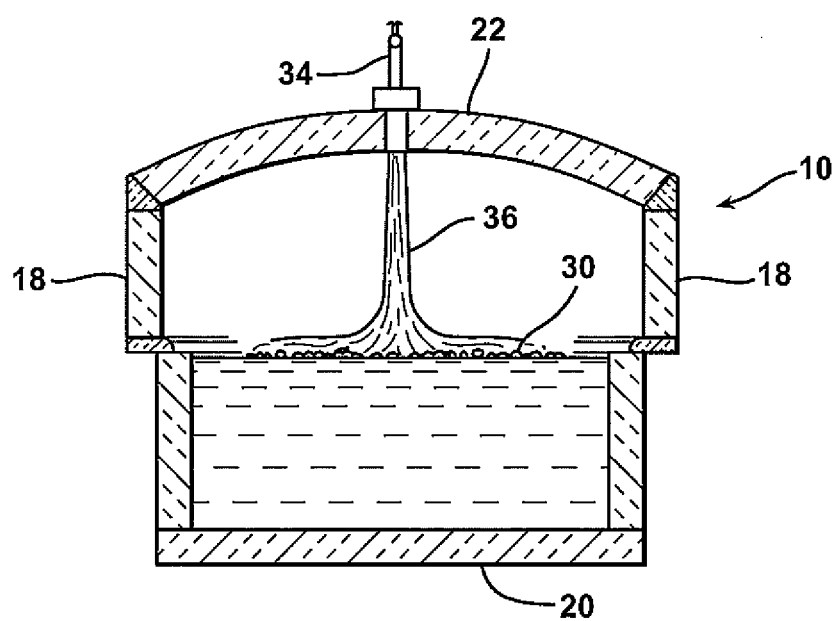
FIG. 4 is an alternate cross-sectional plan view of the glass melting furnace of FIG. 1 taken along line 3-3 illustrating one burner adjacent the upstream end wall of the furnace.

In one preferred embodiment, as shown in FIG. 1, the glass melting furnace (10) includes three burners (34). A single burner (34) is positioned upstream of two adjacently positioned downstream burners (34). However, it will be appreciated that any number of burners (34) may be positioned at any suitable location in the roof (22) of the furnace (10) over the batch to melt the glass batch (30). For example, two burners (34) may be positioned in a side-by-side relationship (FIG. 3) or a single burner may be used (FIG. 4).

It is to be noted that the burners (34) of glass melting furnace (10) may be arranged in the crown (roof) of the furnace, in the side walls, the end walls, submerged within the batch or molten glass, or in combinations thereof.

Other melters may be used without departing from the present invention. Suitable melters include Air-Gas melters, Oxygen-Gas melters, electrically heated melters, or any fossil fuel fired melter. It is possible to add electric boost or bubblers to any of the melting processes. It is also possible to include a separate refining zone (as shown in FIG. 1) or incorporate the refining zone into the main tank of the melter.

Forehearth Arrangement

The forehearth receives molten glass discharged from the glass melting furnace and transports the molten glass, discharging the molten glass in suitable condition to a forming position. The components of the forehearth may be lined with appropriate refractory materials such as alumina, chromic oxide, silica, alumina-silica, zircon, zirconia-alumina-silica, or similar oxide-based refractory materials, in particular the surfaces that are in contact with the molten glass. Preferably such forehearth glass contact surfaces are lined with chromic oxide materials, zircon or combinations thereof.

For compositions having a fiberizing temperature of less than 2650° F. (1454° C.) and a liquidus temperature that is below the fiberizing temperature by at least 80° F. (44° C.), a conventional forehearth may be used.

For other compositions where the fiberizing temperature is high and/or the ΔT is low, other forehearth arrangements may be helpful in promoting an isothermal condition in the molten glass, thereby preventing devitrification. For example, transporting the molten glass through the forehearth at a shallow depth (D), e.g. less than about 8 inches, or preferably less than about 3.5 inches, will improve transmission of heat by radiation throughout the molten glass. Installed oxygen-fuel fired burners are particularly useful as a forehearth heat source in this regard. A typical oxygen-fuel firing system is supplied by BH-F (Engineering) Ltd. of England. As defined here, oxygen-fuel fired burners are burners that use oxygen (e.g., typically 90 to 99 percent purity with an impurity being a combination of nitrogen and argon) in a high purity as an oxidant, instead of ambient air used in air-fuel burners, and fossil fuel for a combustible hydrocarbon supply, but may include burners using oxygen-enriched air (e.g. 30 to 90 percent purity). The flame temperature of an oxygen-gas burner is about 4200 to about 5200° F. (about 2315 to about 2871° C.). At this temperature, the flame and products of combustion radiate energy at wavelengths that the molten glass can absorb. This promotes uniform glass temperature horizontally on the surface of the molten glass and vertically through the molten glass.

Air-fuel burners may also be used a forehearth heat source, particularly when installed with a very tight spacing, e.g. 4 inches apart.

Exemplary forehearth arrangements useful in the present invention are shown in FIGS. 6 and 7. Forehearth (322A) is adapted to deliver a molten substance (e.g., molten glass G) from a glass melting furnace to a point of production (i.e., a forming position, discussed below). Molten glass (G) does not contact an upper portion of the forehearth (322A). Consequently, this portion can be constructed from relatively inexpensive refractory material (i.e., a super structure refractory material, such as silica, mullite, or other materials that are not required to withstand corrosive effects of molten glass (G)).

A lower portion of forehearth (322A) is below the glass level (L) and thus forms a glass contact surface that comes into contact with the molten glass (G). Consequently, this portion of forehearth (322A) is constructed of a more costly glass contact material. A ceramic refractory material (i.e., zircon, chromic oxide, or other suitable material) is a suitable glass contact refractory material because it can sustain the corrosive effects of molten glass (G).

Forehearth (322A) may comprise a top or crown (not shown), a bottom (also not shown), and sidewalls (328A). Forehearth (322A) has an upstream end, generally indicated at (330A), and a downstream end, generally indicated at (332A). An open end (334) may be provided at the downstream end (332A) of forehearth (322A). An end wall (336A) may be provided at the upstream end (330A) of forehearth (322A). One or more glass orifices (338) may be provided in the bottom of forehearth (322A) proximate, adjacent or close to the end wall (336A). The forehearth of the front end, as introduced above, is that portion of the forehearth (322A) having end wall (336A) and glass orifices (338) in the bottom.

Forehearth burners (344), such as oxygen-fuel burners, are positioned above the glass level (L), shown in FIG. 7. The forehearth burners (344) are oriented in a plane (e.g., a substantially horizontal plane) perpendicular to the surfaces (340) and at an acute angle relative to the surfaces (340). The forehearth burners (344) are pointed toward the downstream end 332A of forehearth (322A) at an angle between about 5 degrees to about 85 degrees relative to the surfaces (340), as shown in FIG. 6. Forehearth burners (344) may be staggered or alternatively spaced so that opposing forehearth burners (344) in the opposing sidewalls (328A) are laterally offset or do not laterally align (do not vertically align when viewing FIG. 6) with one another.

The flame temperature of an oxygen-fuel burner is about 4200-5200° F. However, the flame is preferably very small. Consequently, the flame does not directly contact the sidewalls (328A). However, heat radiating from the flame is quite substantial. Although the flame does not directly contact the sidewalls (328A), the sidewalls (328A) are heated sufficiently by convection or heat otherwise radiating from the flame. This radiant heat is sufficient to properly condition the molten glass (G) and maintain the molten glass G at a desired temperature without compromising the integrity of forehearth (322A) by exposing forehearth (322A) to excessively high temperatures. This holds true even if the burners (344) are spaced about 1 foot to about 5 feet apart from one another.

It is to be appreciated that other forehearth burner arrangements are possible and fall within the scope of the invention. For example, another exemplary burner arrangement is illustrated in FIG. 7. The forehearth burners (344) are oriented in a plane (e.g., a substantially vertical plane) perpendicular to the surface (346) and at an acute angle relative to the surface (346). The forehearth burners (344) may be pointed toward the upstream end 330C of the channel (322C) at an angle between about 5 degrees to about 85 degrees relative to the surface 346, as shown in FIG. 7. Alternatively, the forehearth burners (344) can be pointed toward the downstream end (332C) of the channel (322C) at an angle between about 95 degrees to about 175 degrees relative to the surface (346).

It is to be noted that the burners may arranged in the crown (roof) of the forehearth, in the side walls, the end walls, submerged within the batch or molten glass, or in combinations thereof.

Bushing Assembly

Figure 5:
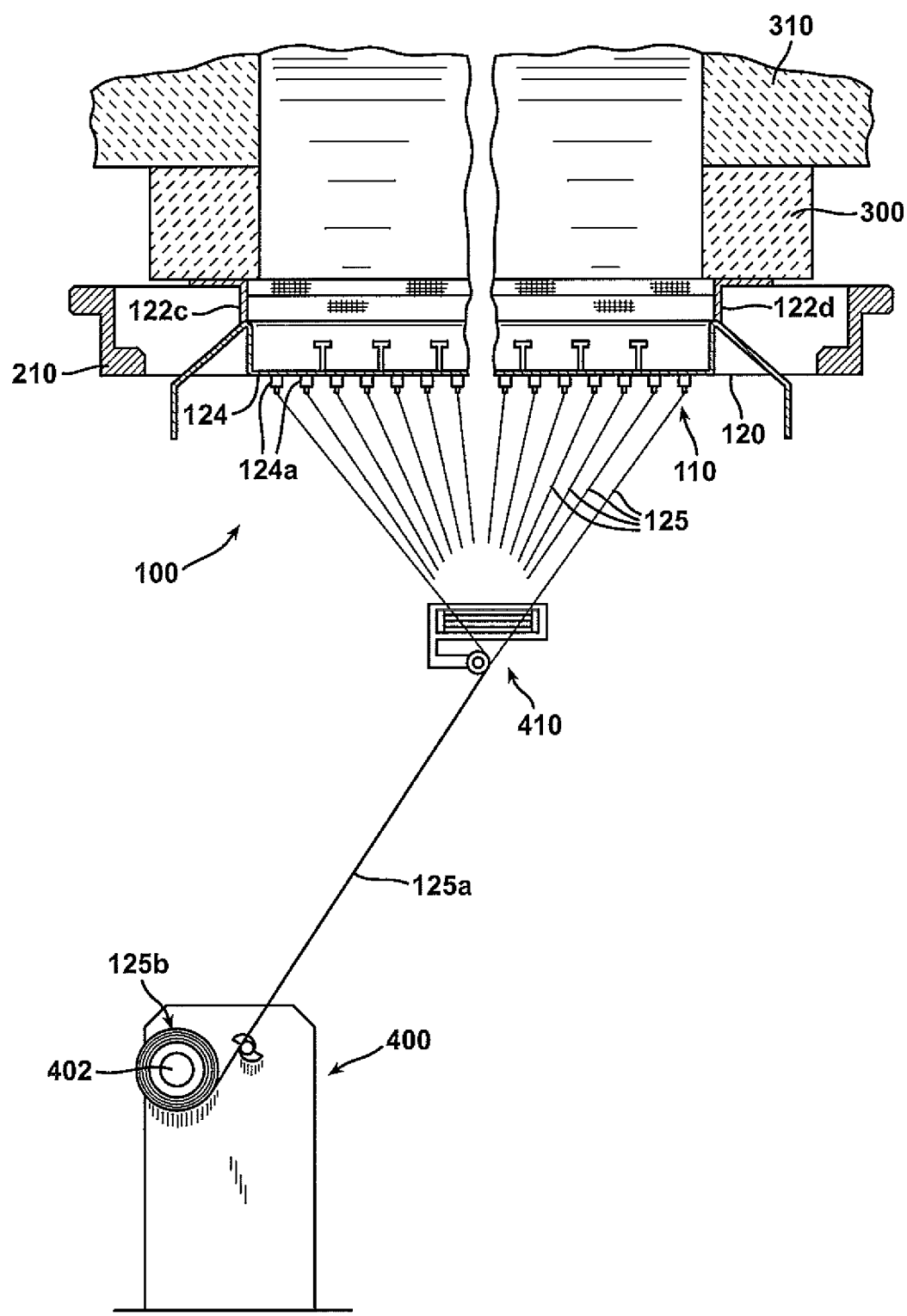
FIG. 5 is a side view, partially in cross section, of a bushing assembly/support structure arrangement for producing continuous glass filaments useful in the method of the present invention.

As shown in FIG. 5, a bushing assembly 100 includes a bushing (110) and a bushing frame 210. The bushing (110) includes a bushing main body (120) with sidewalls (122) and a tip plate (124) extending between the sidewalls (122). The main body (120) is positioned below a bushing block (300) that, in turn, is positioned beneath a forehearth (310). In practicing the method of the present invention, a stream of molten glass is received by the main body (120) from the forehearth (310). The forehearth (310) receives the molten glass from a melter (10) (shown in FIG. 1). A delivery channel (40) is positioned between the melter (10) and the forehearth (310) to deliver the molten glass batch composition (30) from the melter (10) to the forehearth (310). The forehearth (310) and bushing block (300) may be conventional in construction and may be formed from refractory materials.

The tip plate (124) contains a plurality of nozzles (124a) (also referred to as orifices) through which a plurality of streams of molten glass may be discharged. The streams of molten material may be mechanically drawn from the tip plate (124) to form continuous filaments (125) via a conventional winder device (400) such as a winder or chopper or other means of attenuation. The filaments (125) may be gathered into a single or multiple continuous strands (125a) after having received a protective coating of a sizing composition from a sizing applicator (410). The continuous filaments (125a) may be wound onto a rotating collet (402) of the winder device (400) to form a package (125b). The continuous filaments (125) may also be processed into other desired composite glass materials including, without limitation, wet use chopped strand fibers, dry use chopped strand fibers, continuous filament mats, chopped strand mats, wet formed mats or air laid mats.

High strength articles of the present invention use the formed fibers described above as glass fiber reinforcement within a polymer matrix material. Typical matrix materials include epoxies, phenolic resins, vinylesters, and polyesters. The articles may be formed by any suitable manufacturing technique including compression molding, laminating, spray up, hand laying, prefabricated lay-up (prepreg), compression molding, vacuum bag molding, pressure bag molding, press molding, transfer molding, vacuum assisted resin transfer molding, pultrusion molding, filament winding, casting, autoclave molding, centrifugal casting resin transfer and continuous casting.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IIC were melted in platinum crucibles or in a continuous platinum-lined melter for determining the mechanical and physical properties of the glass and fibers produced there from. The units of measurement for the physical properties are: Viscosity (° F.), Liquidus temperature (° F.) and ΔT (° F.). In some examples the glasses were fiberized and Strength (KPsi), Density (g/cc), and Modulus (MPsi) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber.

TABLE II-A

| Glass | Ex. 1 | Ex. 2 | Ex. 3 | Ex. 4 | Ex. 5 | Ex. 6 |
|---|---|---|---|---|---|---|
| $SiO_2$ | 67.2 | 69 | 67 | 70 | 70 | 65 |
| $Al_2O_3$ | 20 | 22 | 22 | 17 | 17 | 21 |
| MgO | 9.8 | 9 | 11 | 11 | 10 | 11 |
| $Li_2O$ | 3 | 0 | 0 | 2 | 3 | 3 |
| Measured Viscosity (° F.) | 2531 | 2761 | 2648 | 2557 | 2558 | 2461 |
| $1^{st}$ Measured Liquidus (° F.) | 2313 | 2619 | 2597 | 2332 | 2302 | 2296 |
| $2^{nd}$ Measured Liquidus (° F.) | 2302 | 2620 | 2614 | 2346 | 2308 | 2318 |
| ΔT (° F.) | 218 | 142 | 51 | 225 | 256 | 165 |
| Measured Density (g/cc) | 2.459 | 2.452 | 2.481 | 2.450 | 2.441 | 2.482 |

TABLE II-B

| Glass | Ex. 7 | Ex. 8 | Ex. 9 | Ex. 10 | Ex. 11 | Ex. 12 |
|---|---|---|---|---|---|---|
| $SiO_2$ | 70 | 69 | 70 | 65 | 66 | 65 |
| $Al_2O_3$ | 18 | 17 | 21 | 22 | 22 | 22 |
| MgO | 9 | 11 | 9 | 11 | 9 | 10 |
| $Li_2O$ | 3 | 3 | 0 | 2 | 3 | 3 |
| Measured Viscosity (° F.) | 2544 | 2496 | 2752 | 2525 | 2523 | 2486 |
| $1^{st}$ Measured Liquidus (° F.) | 2311 | 2234 | 2597 | 2468 | 2391 | 2361 |
| $2^{nd}$ Measured Liquidus (° F.) | 2324 | 2343 | 2603 | 2462 | 2394 | 2382 |
| ΔT (° F.) | 233 | 262 | 155 | 57 | 132 | 125 |
| Measured Density (g/cc) | 2.434 | 2.455 | 2.443 | 2.486 | 2.460 | 2.474 |

TABLE II-C

| Glass | Ex. 13 | Ex. 14 | Ex. 15 | Ex. 16 | Ex. 17 | Ex. 18 |
|---|---|---|---|---|---|---|
| $SiO_2$ | 70 | 67.32 | 67.57 | 68.27 | 68.02 | 67.76 |
| $Al_2O_3$ | 19 | 20.49 | 20.49 | 20.10 | 20.10 | 20.10 |
| MgO | 11 | 10.00 | 10.00 | 9.69 | 9.69 | 9.69 |
| $Li_2O$ | 0 | 2.00 | 1.75 | 1.75 | 2.00 | 2.25 |
| Measured Viscosity (° F.) | 2679 | 2563 | 2584 | 2598 | 2578 | 2547 |
| $1^{st}$ Measured Liquidus (° F.) | 2596 | 2456 | 2486 | 2446 | 2431 | 2399 |
| $2^{nd}$ Measured Liquidus (° F.) | 2582 | 2447 | 2469 | 2469 | 2437 | 2406 |
| ΔT (° F.) | 83 | 111.5 | 106.5 | 140.5 | 144 | 144.5 |
| Measured Density (g/cc) | 2.453 |  | 2.461 |  | 2.452 |  |

The compositions useful in the present invention may also include chain modifiers such as $Na_2O$, CaO and $B_2O_3$. Such compositions are shown in Table II-D (below).

TABLE II-D

| Glass | Ex. 19 | Ex. 21 | Ex. 22 | Ex. 22 | Ex. 23 | Ex. 24 |
|---|---|---|---|---|---|---|
| $SiO_2$ | 75 | 66 | 65 | 65 | 66 | 74 |
| $Al_2O_3$ | 15 | 20 | 20 | 24 | 19 | 15 |
| MgO | 8 | 9 | 8 | 8 | 9 | 8 |
| $Li_2O$ | 1 | 1 | 2 | 0 | 0 | 0 |
| $Na_2O$ | 1 | 2 | 1 | 1 | 2 | 3 |
| CaO |  | 2 | 4 |  |  |  |
| $B_2O_3$ |  |  |  |  | 2 | 4 |
| Measured Viscosity (° F.) | 2765 | 2607 | 2469 | 2669 |  | 2809 |
| $1^{st}$ Measured Liquidus (° F.) | 2422 | 2729 |  | 2614 | 2630 | 2680 |
| ΔT (° F.) | 343 | −122 |  | 55 |  | 129 |

The fibers produced by the present invention have superior modulus and strength characteristics. The fibers of Example 1 have a Measured Modulus of 12.71 MPsi and a Measured Strength of 688 KPsi. The fibers of Example 3 have a Measured Modulus of 12.96 MPsi and a Measured Strength of 737 KPsi. The fibers of Example 17 have a Measured Modulus of 12.75 MPsi and a Measured Strength of 734 KPsi.

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, lithia, alumina, and magnesia components in commercial practice of the invention or they may be processing aids that are essentially lost during manufacture.

As is apparent from the above examples, certain glass fiber compositions useful in the invention have advantageous properties, such as low fiberizing temperatures and wide differences between the liquidus temperatures and the fiberizing temperatures (high ΔT values). Other advantages and obvious modifications of the invention will be apparent to the artisan from the above description and further through practice of the invention.

In certain embodiments the high-performance glass produced by the present invention melts and refines at relatively low temperatures, has a workable viscosity over a wide range of relatively low temperatures, and a low liquidus temperature range.

In other embodiments the high-performance glass produced by the present invention melts and refines at relatively high temperatures, and has a workable viscosity over a relatively small temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A method of forming high strength glass fibers in a continuous system having a glass melting furnace, a forehearth, and a bushing, the method comprising:
   supplying a glass batch to the furnace, wherein at least a portion of the furnace is lined with a material substantially free of noble metals thereby forming a furnace glass contact surface,
   the glass batch being capable of forming a fiberizable molten glass having a fiberizing temperature from 2,400° F. to 2,900° F. and comprising;
   65-75 weight percent $SiO_2$;
   15-30 weight percent $Al_2O_3$;
   5-20 weight percent MgO;
   0-4 weight percent CaO;
   1.0-3 weight percent $Li_2O$; and trace impurities;
   melting the glass batch in the furnace by providing heat from a furnace heat source and forming a pool of molten glass in contact with the furnace glass contact surface;
   transporting the molten glass from the furnace to the bushing via the forehearth, wherein the forehearth is heated from a forehearth heat source, and wherein the forehearth is at least partially lined with a material substantially free of noble metal materials, forming a forehearth glass contact surface;
   discharging the molten glass from the forehearth into the bushing at a predetermined viscosity; and
   forming the molten glass into continuous glass fibers, the fibers having a pristine tensile strength greater than 700 kPsi.

2. The method of claim 1, wherein the transporting step includes flowing the molten glass through the forehearth at a depth of less than 8 inches.

3. The method of claim 2, wherein the transporting step includes flowing the molten glass through the forehearth at a depth of less than 3.5 inches.

4. The method of claim 1, wherein at least a portion of the furnace is lined with an oxide-based refractory material.

5. The method of claim 4, wherein at least a portion of the furnace is lined with a material selected from the group consisting of chromic oxide materials and zircon.

6. The method of claim 1, wherein at least a portion of the furnace is lined with externally cooled walls.

7. The method of claim 1, wherein at least a portion of the forehearth is lined with an oxide-based refractory material.

8. The method of claim 7, wherein at least a portion of the forehearth is lined with a material selected from the group consisting of chromic oxide materials and zircon.

9. The method of claim 1, wherein the furnace heat source comprises one or more oxy-fuel burners disposed in a roof, a sidewall, an endwall, or a bottom of the furnace, or combinations thereof.

10. The method of claim 1, wherein the forehearth heat source further comprises one or more oxy-fuel burners disposed in a roof, a sidewall, or an endwall of the forehearth, or combinations thereof.

11. The method of claim 1, wherein the forehearth heat source further comprises one or more air-fuel burners disposed in a roof, a sidewall, or an endwall of the furnace, or combinations thereof, at a spacing sufficient to prevent devitrification of the molten glass in the forehearth.

12. The method of claim 11, wherein the air-fuel burners are spaced at least 4 inches apart.

13. The method of claim 1, wherein the furnace includes one or more bubblers, electric boost electrodes, and combinations thereof.

14. The method of claim 1, wherein the forehearth includes one or more bubblers, electric boost electrodes, and combinations thereof.

15. The method of claim 1, wherein the predetermined viscosity is 1000 poise.

16. The method of claim 1, wherein the predetermined viscosity is 316 poise.

17. The method of claim 1, wherein the glass fibers have a density of 2.434-2.520 g/cc.

18. The method of claim 1, wherein the glass fibers have a measured modulus greater than 12.7 MPsi.

19. The method of claim 1, wherein the glass fibers have a density of 2.434-2.520 g/cc and a measured modulus greater than 12.7 MPsi.

20. The method of claim 1, wherein the glass fibers have a density of 2.434-2.486 g/cc.

* * * * *